United States Patent
Hart et al.

(10) Patent No.: US 7,983,667 B2
(45) Date of Patent: Jul. 19, 2011

(54) RADIO FREQUENCY COVERAGE MAP GENERATION IN WIRELESS NETWORKS

(75) Inventors: Brian Donald Hart, Sunnyvale, CA (US); Robert J. Friday, Los Gatos, CA (US); Milind Paranjpe, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 897 days.

(21) Appl. No.: 11/543,747

(22) Filed: Oct. 5, 2006

(65) Prior Publication Data

US 2008/0085692 A1    Apr. 10, 2008

(51) Int. Cl.
H04W 24/00    (2009.01)
H04W 40/00    (2009.01)
(52) U.S. Cl. .................. 455/423; 455/446; 455/448
(58) Field of Classification Search .................. 455/423, 455/456.1
See application file for complete search history.

(56) References Cited

U.S. PATENT DOCUMENTS

| | | | |
|---|---|---|---|
| 4,254,467 A | 3/1981 | Davis et al. | |
| 5,028,848 A | 7/1991 | Bankston et al. | |
| 5,327,144 A | 7/1994 | Stilp et al. | |
| 5,394,158 A | 2/1995 | Chia | |
| 5,396,582 A | 3/1995 | Kahkoska | |
| 5,564,079 A | 10/1996 | Olsson | |
| 5,570,412 A | 10/1996 | LeBlanc | 455/456.2 |
| 5,666,662 A | 9/1997 | Shibuya | |
| 5,717,406 A | 2/1998 | Sanderford et al. | 342/457 |
| 5,732,354 A | 3/1998 | MacDonald | |
| 6,112,095 A | 8/2000 | Wax et al. | |
| 6,115,605 A | 9/2000 | Siccardo et al. | |
| 6,134,338 A | 10/2000 | Solberg et al. | |
| 6,134,448 A | 10/2000 | Shoji et al. | |
| 6,140,964 A | 10/2000 | Sugiura et al. | |
| 6,167,274 A | 12/2000 | Smith | |
| 6,198,935 B1 | 3/2001 | Saha et al. | |
| 6,212,391 B1 | 4/2001 | Saleh et al. | |
| 6,226,400 B1 | 5/2001 | Doll | |
| 6,236,365 B1 | 5/2001 | LeBlanc et al. | |
| 6,243,811 B1 | 6/2001 | Patel | |
| 6,249,252 B1 | 6/2001 | Dupray | |
| 6,269,246 B1 | 7/2001 | Rao et al. | |
| 6,272,541 B1 | 8/2001 | Cromer et al. | |
| 6,275,190 B1 | 8/2001 | Sugiura et al. | |
| 6,282,427 B1 | 8/2001 | Larsson et al. | |
| 6,304,218 B1 | 10/2001 | Sugiura et al. | |
| 6,317,599 B1 | 11/2001 | Rappaport et al. | |
| 6,317,604 B1 | 11/2001 | Kovach et al. | |
| 6,414,634 B1 | 7/2002 | Tekinay | |
| 6,415,155 B1 | 7/2002 | Koshima et al. | |

(Continued)

Primary Examiner — George Eng
Assistant Examiner — Jing (Kristen) Gao
(74) Attorney, Agent, or Firm — Baker Botts L.L.P.

(57) ABSTRACT

In one embodiment, a method for generating a radio-frequency coverage map. The method includes receiving coverage map data comprising a plurality of locations within a region, and an identification of a location in the plurality of locations corresponding to a radio transceiver, wherein the locations within the region are represented by at least corresponding x- and y-terms of a Cartesian coordinate system. The method further includes receiving calibration data comprising a plurality of observed signal strength values at corresponding ones of the plurality of locations, converting the x- and y-terms of the locations of the coverage map data to corresponding first and second warped coordinate terms of a warped coordinate system, and computing, using linear interpolation and the first and second warped coordinate terms, predicted received signal strength values at one or more locations in the coverage map based on the calibration data.

17 Claims, 6 Drawing Sheets

U.S. PATENT DOCUMENTS

| | | |
|---|---|---|
| 6,441,777 B1 | 8/2002 | McDonald |
| 6,456,892 B1 | 9/2002 | Dara-Abrams et al. |
| 6,526,283 B1 | 2/2003 | Jang |
| 6,556,942 B1 | 4/2003 | Smith |
| 6,581,000 B2 | 6/2003 | Hills et al. |
| 6,664,925 B1 | 12/2003 | Moore et al. |
| 6,674,403 B2 | 1/2004 | Gray et al. .................... 342/463 |
| 6,704,352 B1 | 3/2004 | Johnson |
| 6,728,782 B1 | 4/2004 | D'Souza et al. |
| 6,754,488 B1 | 6/2004 | Won et al. |
| 6,766,453 B1 | 7/2004 | Nessett et al. |
| 6,799,047 B1 | 9/2004 | Bahl et al. .................. 455/456.1 |
| 6,804,394 B1 | 10/2004 | Hsu |
| 6,850,946 B1 | 2/2005 | Rappaport et al. |
| 6,990,428 B1 | 1/2006 | Kaiser et al. .................. 702/150 |
| 2002/0045424 A1 | 4/2002 | Lee ................................ 455/41 |
| 2002/0102988 A1 | 8/2002 | Myllymaki |
| 2002/0115445 A1 | 8/2002 | Myllymaki |
| 2002/0118118 A1 | 8/2002 | Myllymaki et al. |
| 2002/0154134 A1 | 10/2002 | Matsui |
| 2002/0168958 A1 | 11/2002 | Ford et al. |
| 2002/0174335 A1 | 11/2002 | Zhang et al. |
| 2002/0176366 A1 | 11/2002 | Ayyagari et al. |
| 2003/0117985 A1 | 6/2003 | Fujii et al. |
| 2003/0130987 A1 | 7/2003 | Edlund et al. |
| 2003/0135486 A1 | 7/2003 | Edlund et al. |
| 2003/0135762 A1 | 7/2003 | Macaulay |
| 2004/0066757 A1 | 4/2004 | Molteni et al. ................. 370/329 |
| 2004/0072577 A1 | 4/2004 | Myllymaki et al. |
| 2004/0111397 A1 | 6/2004 | Chen et al. |
| 2004/0151377 A1 | 8/2004 | Boose et al. |
| 2004/0166878 A1 | 8/2004 | Erskine et al. ............. 455/456.1 |
| 2004/0176108 A1 | 9/2004 | Misikangas |
| 2004/0186847 A1 | 9/2004 | Rappaport et al. |
| 2004/0198373 A1 | 10/2004 | Ford et al. |
| 2004/0198392 A1 | 10/2004 | Harvey et al. ............. 455/456.1 |
| 2004/0203910 A1 | 10/2004 | Hind et al. ................ 455/456.1 |
| 2004/0236547 A1 | 11/2004 | Rappaport et al. |
| 2004/0259554 A1 | 12/2004 | Rappaport et al. |
| 2004/0259555 A1 | 12/2004 | Rappaport et al. |
| 2005/0047646 A1* | 3/2005 | Jojic et al. ..................... 382/159 |
| 2005/0114332 A1* | 5/2005 | Lee et al. ......................... 707/6 |
| 2005/0128139 A1* | 6/2005 | Misikangas et al. .......... 342/350 |
| 2005/0131635 A1 | 6/2005 | Myllymaki et al. |
| 2005/0136944 A1 | 6/2005 | Misikangas et al. |
| 2005/0185615 A1 | 8/2005 | Zegelin ........................ 370/331 |
| 2005/0246334 A1* | 11/2005 | Tao et al. .......................... 707/5 |

\* cited by examiner

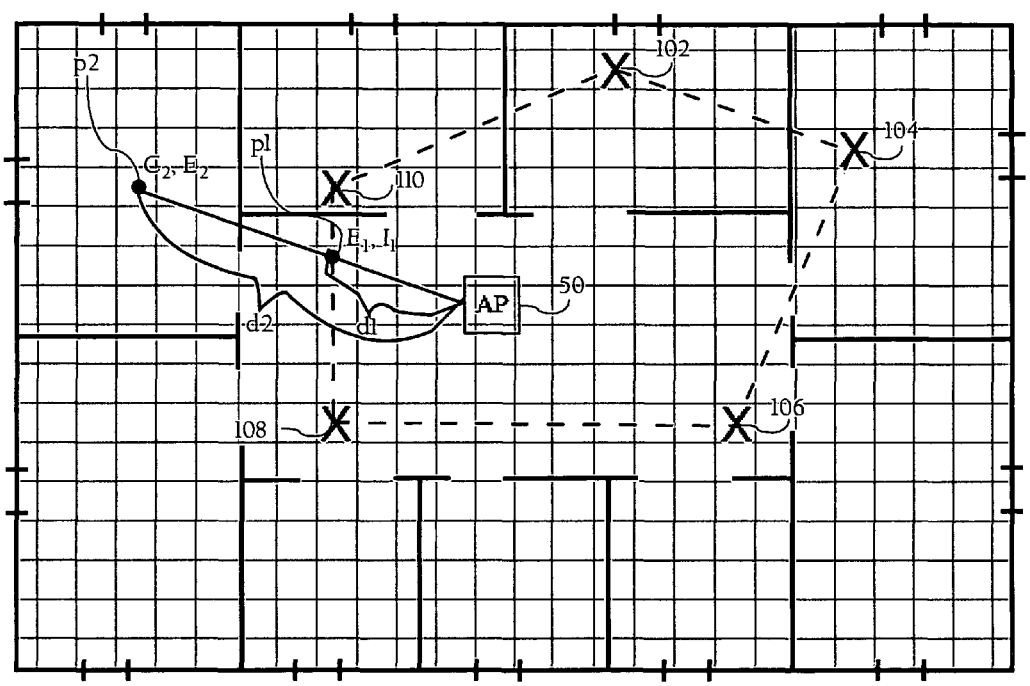
Fig._1

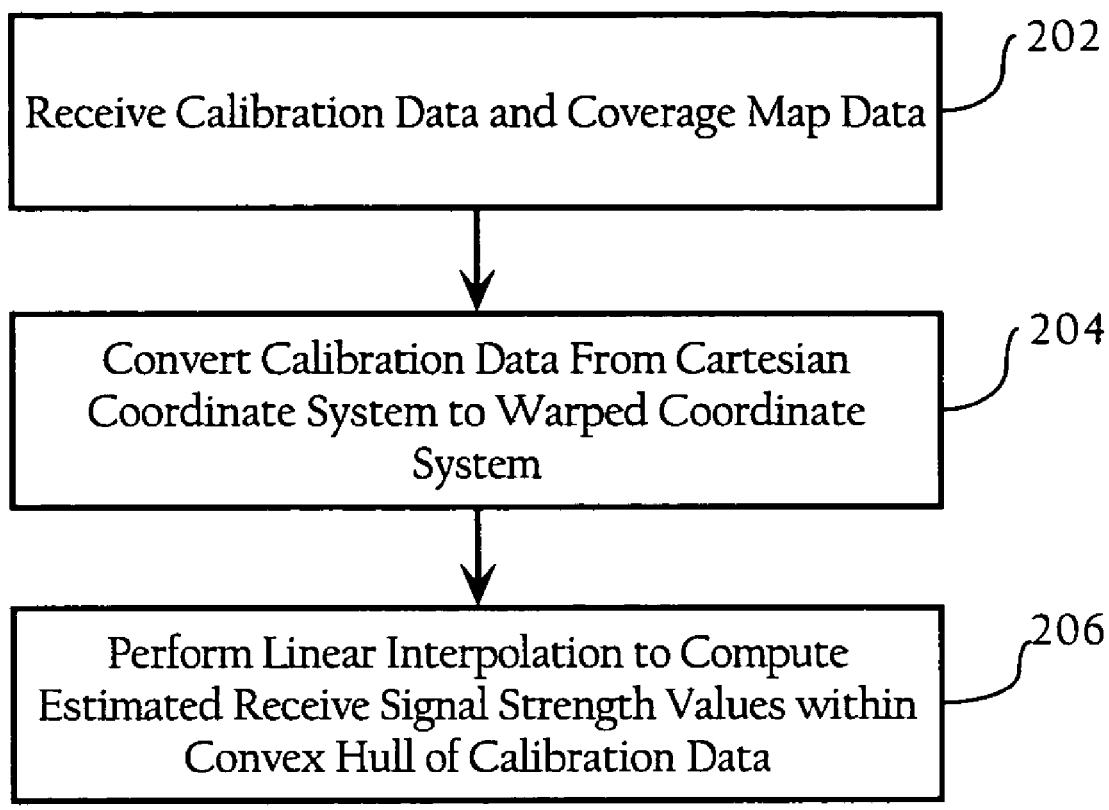
Fig._2

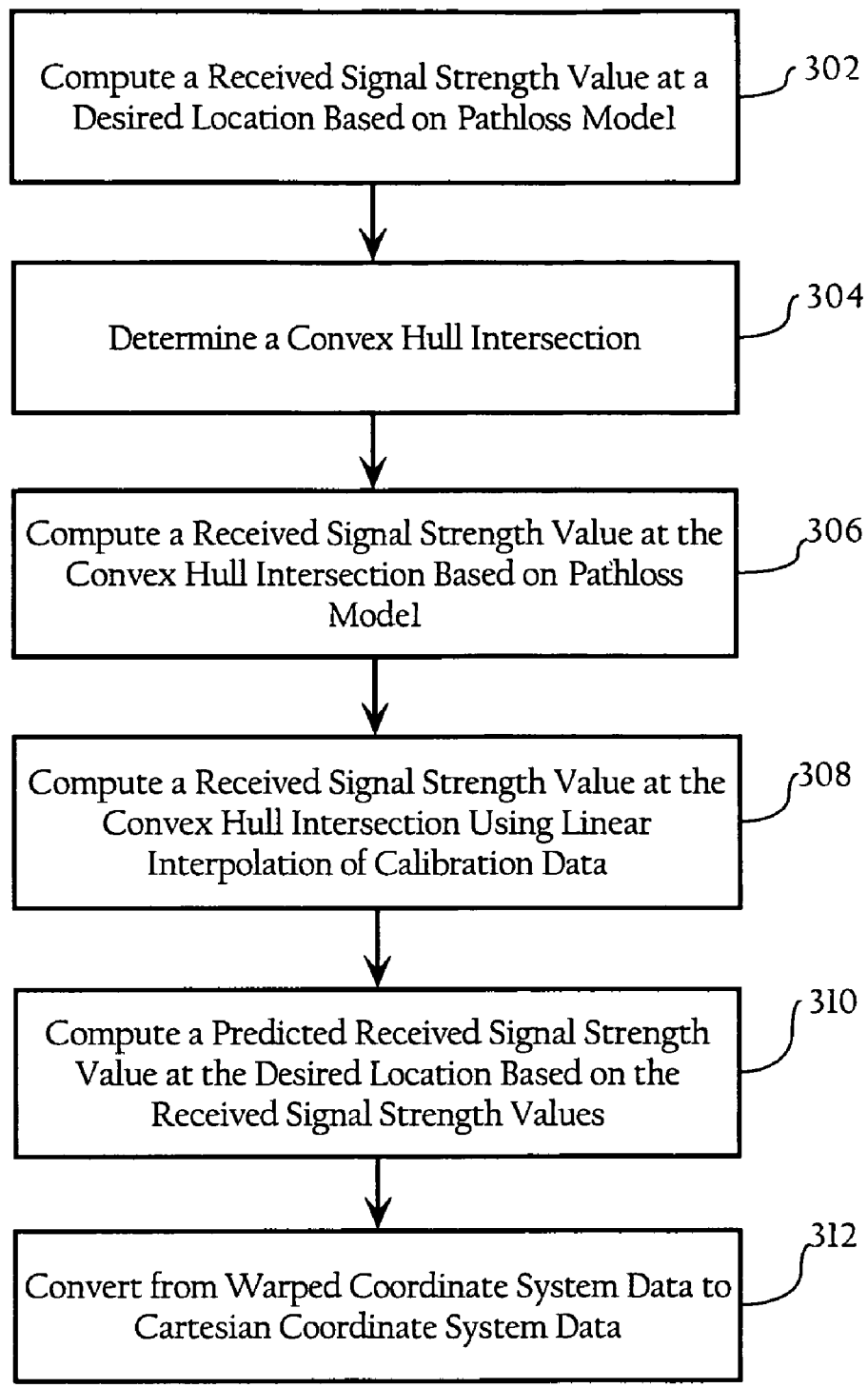
Fig._3

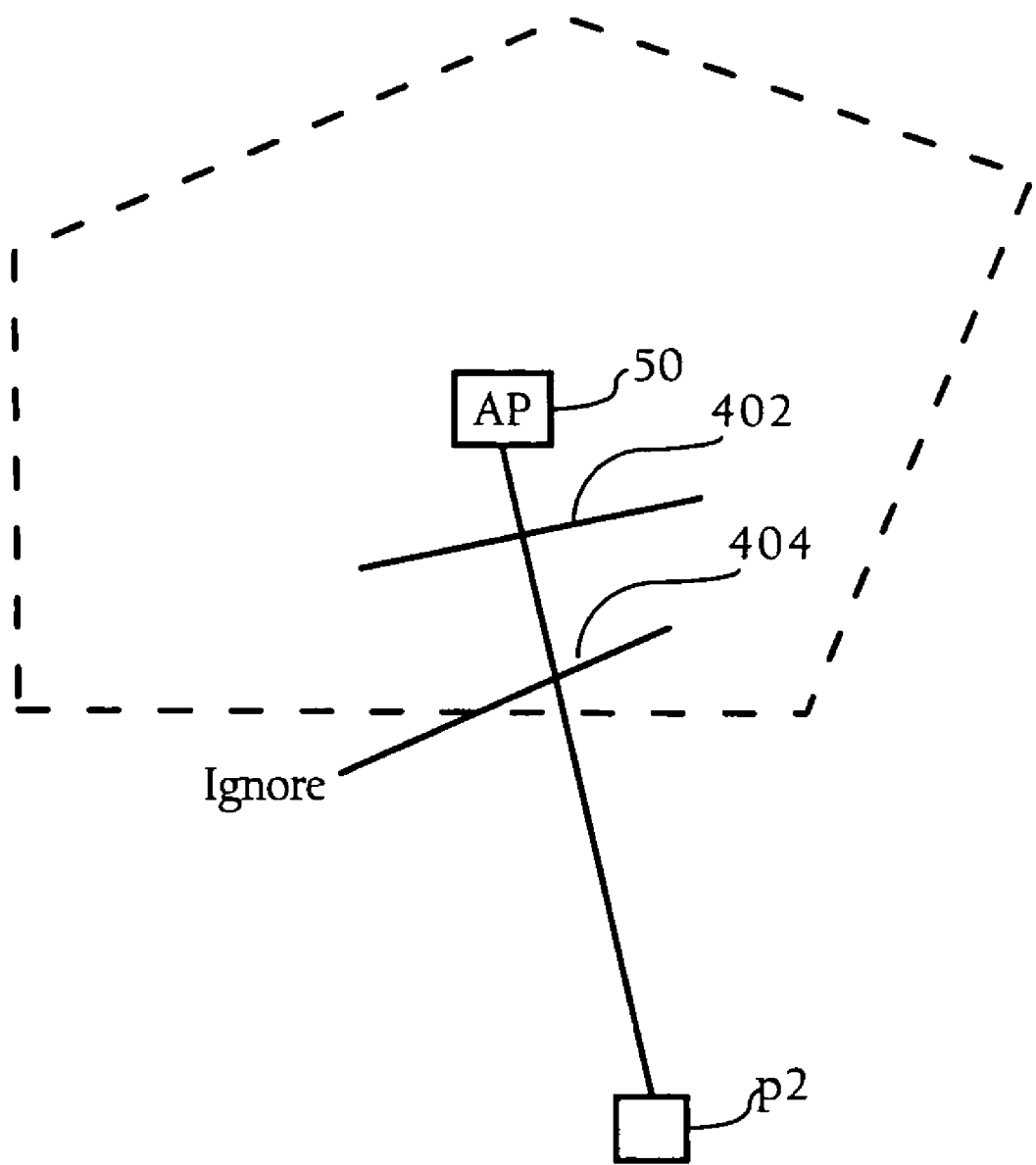
Fig._4

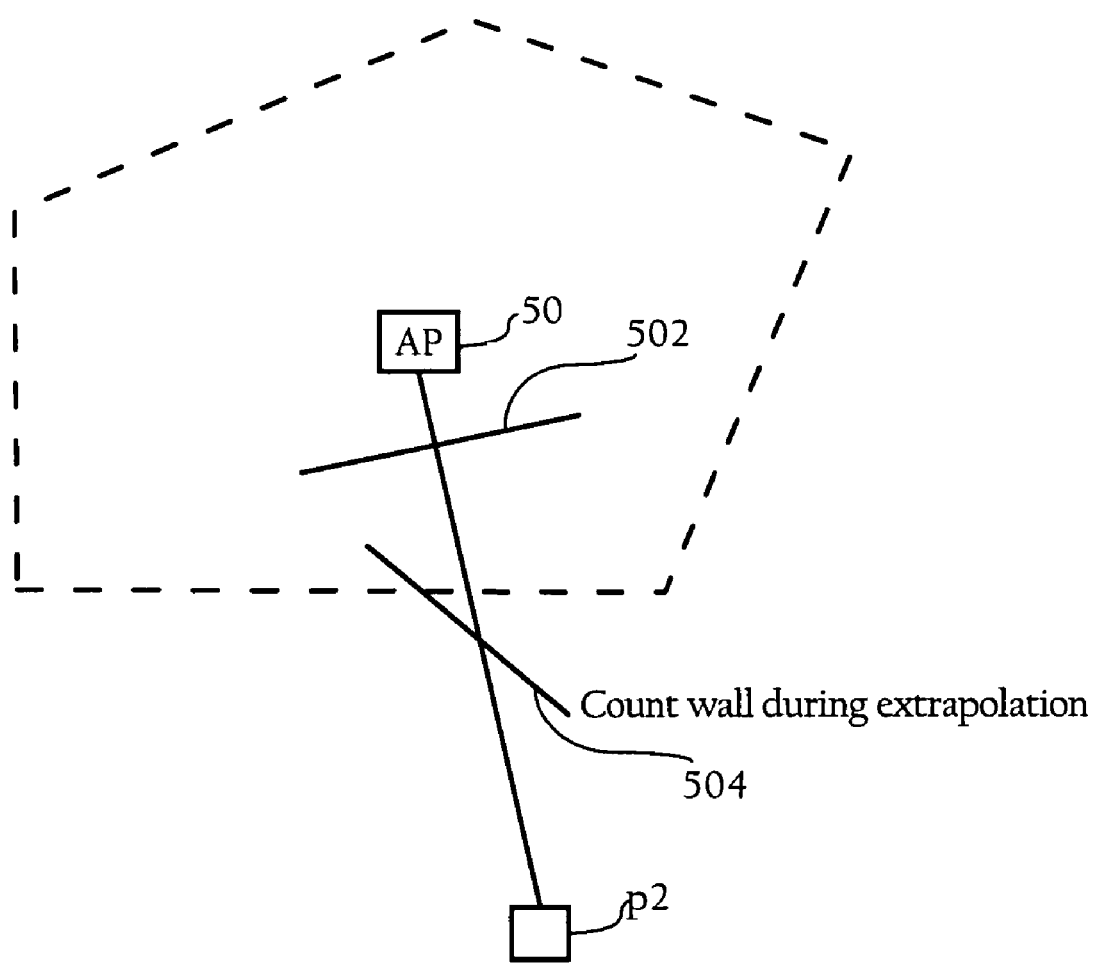
Fig._5

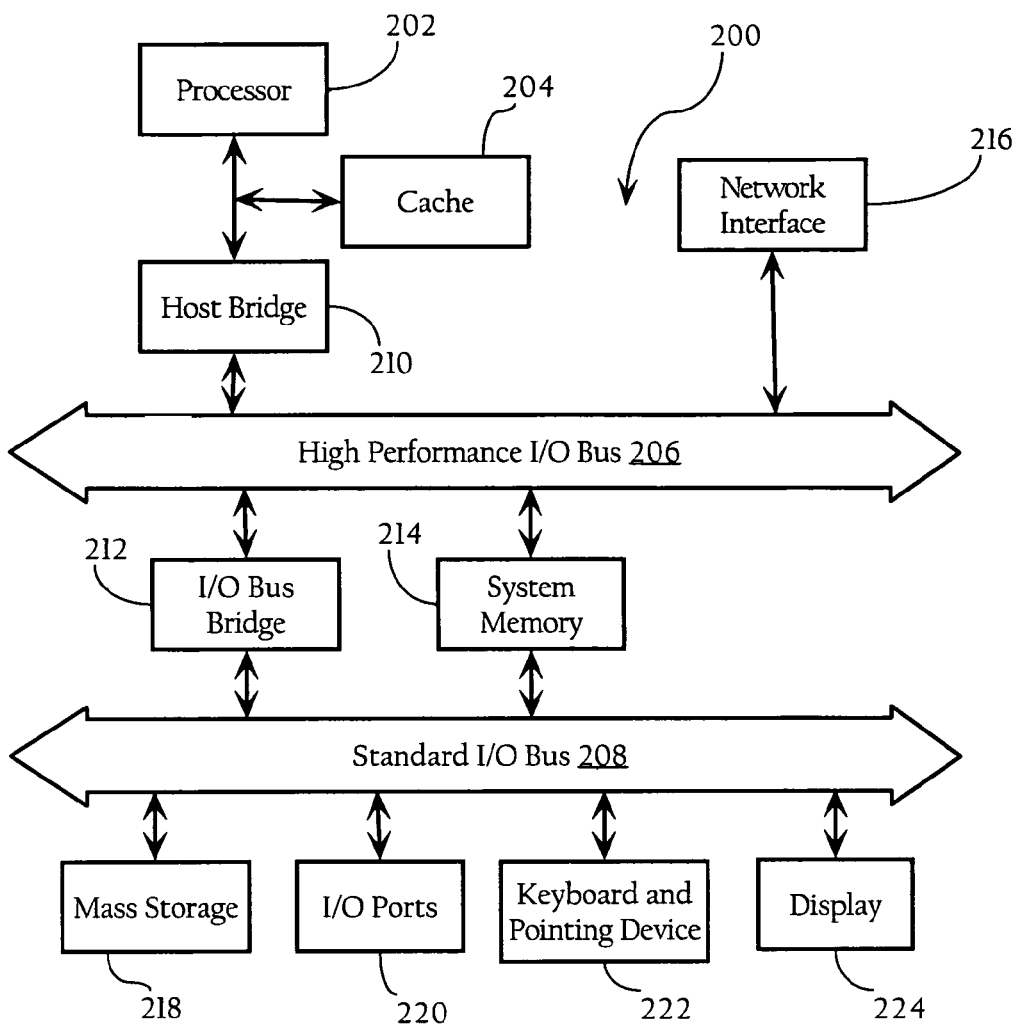
Fig._6

RADIO FREQUENCY COVERAGE MAP GENERATION IN WIRELESS NETWORKS

TECHNICAL FIELD

This disclosure relates generally to wireless networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. Radio frequency (RF) coverage maps, also referred to as a heat maps, provide information regarding coverage of particular wireless access points. RF coverage maps are useful for assessing the area or region of sufficient WLAN service, and for use in locating wireless nodes. RF coverage maps are typically derived from manual site surveys and mathematical modeling techniques, such as ray tracing. However, shadowing from nearby walls and furniture, and the multipath effects inherent to various RF environments, make high accuracy coverage maps difficult to achieve.

DESCRIPTION OF THE DRAWINGS

FIG. 1 illustrates an example physical space and a convex hull of calibration data associated with an access point.

FIG. 2 illustrates an example process flow associated with converting data between first and second coordinate systems, and performing linear interpolation to compute estimated signal strength values for an RF coverage map.

FIG. 3 illustrates an example process flow associated with interpolating one or more values of an RF coverage map.

FIG. 4 illustrates example walls in relation to a convex hull.

FIG. 5 illustrates other example walls in relation to a convex hull.

FIG. 6 illustrates an example computing system architecture that can be used to implement one or more aspects of the functionality described herein.

DESCRIPTION OF EXAMPLE EMBODIMENTS

A. Overview

Particular embodiments of the present invention are directed to generating RF coverage maps in wireless networks using a coordinate warping scheme described herein. According to one implementation of the present invention, an RF coverage map generation system receives calibration data comprising received signal strength samples corresponding to a radio frequency transmitter, such as a wireless access point, from known locations within a physical region system, and generates an RF coverage map using interpolation to generate estimated receive signal strength values for points between the known locations of the calibration data. In one implementation, the RF coverage map generation system converts calibration and coverage map data expressed in Cartesian coordinates to a warped coordinate system, and then computes, using interpolation, predicted received signal strength values (e.g., RSSI data) at particular locations inside a given area using calibration data (e.g., known, observed received signal strength values, etc.). According to another implementation of the present invention, the RF coverage map generation system computes, using extrapolation, predicted received signal strength values at particular locations outside a given area using calibration data. These interpolation and extrapolation processes minimize the need to collect data via manual site surveys while providing accurate RF coverage maps.

B. Convex Hull of Calibration Data

FIG. 1 illustrates an example physical space and convex hull corresponding to a set of calibration data. Calibration data comprises received signal strength data corresponding to wireless access point 50 determined at known locations ("X"). As FIG. 1 illustrates, a convex hull is an area defined by three or more known locations or calibration points (e.g., locations 102, 104, 106, 108, and 110) relative to a wireless access point 50. That is, a convex hull is the smallest area that includes all desired location points in a set of calibration data. The calibration data is typically generated manually with a site survey. In one implementation, a user such as a network administrator performs a site survey to generate the calibration data for each of the locations 102-110. As described in further detail below, an RF coverage map generator generates RF coverage maps by interpolating and, in some implementations, extrapolating predicted received signal strength values based on the calibration data at the locations 102-110 using mathematical interpolation and extrapolation algorithms. Interpolation and extrapolation of predicted received signal strength values (e.g., $I_1$ and $E_1$ and $E_2$) are described in detail below in connection with FIGS. 2 and 3.

C. Power Law Pathloss Model

In one implementation, the RF coverage map generator interpolates the calibration data in such a way that it accounts for the power law pathloss model behavior. In one implementation, the power law pathloss model is described using the following expression:

$$\text{Received signal strength}(x,y) = Tx + \text{antenna gain}(x,y) + A + B 10\log 10\ d + \text{error}(x,y),$$

where (x, y) are expressed relative to the antenna, Tx is the transmit power, d is the distance between a given interpolation point and the transmitter of the wireless access point, and error(x,y) allows for real-world effects that cause the received signal strength to differ from its predicted value. In one implementation, Tx, the antenna gain, and d are known (e.g., observed/measured or assumed). A and B are pathloss exponents of a pathloss model, where A is a constant representing the y intercept, and B is a slope. In one implementation, A and B may be default values (e.g., A=−46 and B=−3.3) or may be derived from the calibration data. When derived, the calibration data provides actual sampled/observed values, which the RF coverage map generator may use to compute the A and B pathloss exponents. In one embodiment it uses a least squares technique with 10 log 10 (d) and received signal strength as x and y values. As described in more detail below, the RF coverage map generator, using a coordinate warping scheme, interpolates within the convex hull to generate estimated signal strength values for a coverage map. In one implementation, the RF coverage map generator uses extrapolation to generate signal strength values outside the convex hull. Accordingly, in one implementation, the "A" term of the pathloss model may be modified such that the resulting RF coverage map is smooth at the boundary between interpolation and extrapolation (see Section D.2., below). Note that traditional 2-dimensional interpolation routines assume a linear model, such as $$\text{Received signal strength } (x,y) = Tx + \text{antenna gain}(x,y) + A + Bd + \text{error}(x,y).$$

yet this is a poor description of reality.

D. RF Coverage Map Generation

D.1. Interpolation

In one implementation, as described above, the RF coverage map generator computes, using linear interpolation, estimated received signal strength values (e.g., RSSI data) at particular locations within the convex hull using the calibration data (e.g., observed, received signal strength values at known locations, etc.).

FIG. 2 illustrates an example process flow associated with interpolation. As FIG. 2 illustrates, the RF coverage map generator receives calibration data and coverage map data (202), where the calibration data and the coverage map data are expressed as Cartesian coordinate system data (e.g., x, y, and RSSI, where RSSI is a received signal strength value). In one embodiment, the calibration data may include observed, received signal strength values at known locations (in x, y, and z). The coverage map data, in one implementation, represents a physical space or region in which the radio transmitter (e.g., access point) is deployed. In one implementation, the coverage map data can be a vector model of the physical space including the location and height of physical obstructions (such as walls). In one implementation, the region covered by the coverage map data is divided into uniformly sized regions or location bins (as illustrated in FIG. 1). In one implementation, each location bin is identified relative to the Cartesian (x,y) coordinates of the center of each location bin. Coverage map data may include other information such as vector models of RF obstacles in physical space (e.g., wall coordinates), wireless access point attributes, antenna type and orientation, nominal transmit power, etc.

Next, the RF coverage map generator converts the calibration data and the coverage map data from Cartesian coordinate system data (x, y) to polar coordinate system data (d, θ) (204), where the origin of the polar coordinate system is the location of the radio transceiver (e.g., an access point), and d is the distance from the origin at an angle theta θ.

In one implementation, the RF coverage map generator warps the coordinate system such that linear interpolation in the warped coordinate system matches the desired PL=A+B log 10 (d) behavior. In one implementation, this is accomplished by converting the received signal strength versus X,Y points of the calibration data into received signal strength versus (log 10 d)cos θ and (log 10 d)sin θ points. In one implementation, the RF coverage map generator may use a logarithm with any base, or any function substantially equivalent to a logarithm. In one implementation, the RF coverage map generator performs the linear interpolation within the convex hull via a standard linear interpolation routine as though the terms, (log 10 d)cos θ and (log 10 d)sin θ were X and Y values, respectively, in a Cartesian coordinate system. In one implementation, the interpolation region, in the warped coordinate scheme, is roughly circular (e.g., typically with a few received signal strength points in the middle), and becomes more dense toward the perimeter.

In one implementation, the RF coverage map generator may include added "helper" or auxiliary points immediately surrounding the origin (the location of the wireless access point), wherever nearby real received signal strength values are absent. This addresses an issue that may arise where there are no received signal strength values in the calibration data that are near the wireless access point (e.g., only lower received signal strength values further out from the wireless access point), which may result in interpolated received signal strength values at the wireless access point that are unrealistically low. In one implementation, the auxiliary points may include, for example, four auxiliary location bins or points at a 1 foot radial distance north, south, east, and west of the wireless access point. The received signal strength at these auxiliary points may be calculated from the nominal transmit power of the radio transceiver, as well as elevation angle, azimuth beam pattern, elevation beam pattern, azimuth angle, etc., of the wireless access point. In one implementation, a small error may be introduced and accounted for since these auxiliary points may very close to the wireless access point, nominally within line-of-sight.

Next, the RF coverage map generator performs linear interpolation on the warped coordinate system data to obtain estimated received signal strength values at one or more locations of the coverage map within the convex hull (206). Two-dimensional linear interpolation can be used. One algorithm involves Delaunay triangularization followed by interpolation within the planes defined by the Delaunay triangles.

D.2. Extrapolation

In one implementation, location bins in the coverage map beyond the convex hull of the calibration data may be populated through extrapolation by using nominal pathloss exponents and by ensuring that the extrapolated received signal strength values agree with the received signal strength values on the perimeter of the interpolated region of the coverage map. In one implementation, the wireless infrastructure may compute, using extrapolation, predicted received signal strength values at particular locations outside the convex hull using calibration data, according to the following expression:

$$E_2 = C_2 + (I_1 - C_1),$$

where $C_2$ is a predicted received signal strength value at point (p2) (a point or location bin outside the convex hull for which an extrapolated signal strength value is to be computed) and at a distance d2 from the radio transceiver associated with the coverage map, using a pathloss exponent model; $C_1$ is a predicted received signal strength value at point (p1) (the intersection of the convex hull and a line extending from the radio transceiver to point d2) and at a distance d1 from the radio transceiver; and $I_1$ is an interpolated value at point p1. As the foregoing equation provides, $(I_1 - C_1)$ the difference between the interpolated value based on calibration data ($I_1$) and the value computed with a pathloss model is a correction factor applied to $C_2$, the value computed by the pathloss model at point d2. See also FIG. 1. In one implementation, the pathloss exponent A can be chosen such that there is a smooth transition between the interpolated values within the convex hull and the location bins outside the convex hull. In one implementation, the intersection between the line extending from the radio transceiver and the convex hull may be resolved to the nearest location bin of the RF coverage map or may be resolved to a previously calculated value for that location bin. Alternatively, in one implementation, the intersection may be independent of a location bin and resolved to an actual intersection.

FIG. 3 illustrates an example process flow associated with extrapolation. As FIG. 3 illustrates, the RF coverage map generator computes a received signal strength value at a desired location (e.g., $C_2$) based on a power law pathloss model (302). Next, the RF coverage map generator determines a convex hull intersection (304). In one embodiment, the convex hull intersection is the intersection of the convex hull and a line extending between the wireless access point and the desired location. Next, the RF coverage map generator computes a received signal strength value at a convex hull intersection (e.g., $C_1$) based on the power law pathloss model (306). Next, the RF coverage map generator computes a received signal strength value at the convex hull intersection (e.g., $I_1$) using interpolation of the calibration data (308). Next, the RF coverage map generator computes a predicted received signal strength value at the desired location based on the received signal strength values (e.g., $C_2$, $C_1$, and $I_1$) (310).

Referring again to FIG. 2, the RF coverage map generator then converts the predicted received signal strength values from warped coordinate system data to Cartesian coordinate system data (312). In one embodiment, the RF coverage map generator may perform the conversion using a mathematical relation equation (e.g., x=(log 10 d)cos θ and y=(log 10 d)sin θ) or may perform the conversion using a mapping generated when originally converting between the original Cartesian coordinate system data and the warped coordinate system data.

D3. Walls

In some instances, walls may affect the accuracy of the interpolated and/or extrapolated received signal strength values. Accordingly, in some implementations, the following consideration may be incorporated into the interpolation and extrapolation processes described above. Walls may often be represented by straight line segments in the Cartesian coordinate system. Yet, the convex hull, as described above, may be calculated upon a warped ((log 10 d)cos θ, (log 10 d)sin θ) coordinate system. Therefore it is possible for straight walls, which are entirely outside the convex hull, to actually intersect the convex hull when expressed in the warped coordinate scheme. Accordingly, in one implementation, the RF coverage map generator may define the perimeter of the interpolation region to be the innermost region of either 1) the de-warped convex hull of the warped received signal strength points, and 2) the convex hull of the received signal strength points in the Cartesian coordinate system. Accordingly, walls outside the convex hull in the Cartesian coordinate system remain entirely outside the interpolation region, and their attenuation is experienced by points behind them, for the whole of their length.

Walls that are partially inside and partially outside the convex hull may be more complicated than a wall entirely inside or entirely outside the convex hull. FIG. 4 illustrates example walls 402 and 404 in relation to a convex hull according to one implementation of the present invention. As FIG. 4 illustrates, walls 402 and 404 may often be represented by straight line segments in the XY coordinate system. In one implementation, with regard to walls, such as wall 402, entirely inside the convex hull, and walls, such as wall 404, where the portion of the wall intersecting the path between the wireless access point 50 and a given location p2 is inside the convex hull, the predicted received signal strength values derived from interpolation and extrapolation already account for attenuation due to the existence of the walls within the convex hull. Accordingly, in one implementation, these walls may be ignored. FIG. 5 illustrates other example walls 502 and 504 in relation to a convex hull. As FIG. 5 illustrates, wall 502 is entirely inside the convex hull and a portion of wall 504 intersecting the path between the wireless access point 50 and a given location p2 is outside the convex hull. In this implementation, the attenuation due to wall 504 is incorporated into the extrapolation algorithm discussed herein.

Walls outside of the convex hull (or interpolation region) and intersecting the line extending between point AP and p2, in one implementation, are also accounted for when extrapolating for points outside the interpolation region. As to all applicable walls intersecting the line extending between point AP and p2, an attenuation based on the number of walls outside the convex hull and between the extrapolation point and the radio transceiver may be subtracted from the value of $E_2$. In one implementation, the attenuation for a given wall (e.g., wall 504) may be based on wall type (e.g., steel, concrete) and the wall dimensions (e.g., length and width) may also be subtracted from the value of $E_2$. Accordingly, E2 can be expressed as $$E_2 = C_2 + (I_1 - C_1) - \sum_1^w A(w),$$

where w is the number of walls intersecting the line extending between point AP and p2; and A(w) is the attenuation for wall (w).

In another implementation, there may be two wall sub-classes that are partially inside and partially outside. In one sub-class (a), there is at least one received signal strength measurement in the calibration data behind the wall. In another sub-class (b), there are no received signal strength measurements behind the wall relative to the origin or radio transceiver. For subclass (a), in one implementation, the RF coverage map generator may compute the received signal strength value on the convex hull of the interpolated coverage map as if the wall were absent. In one implementation, the RF coverage map generator may add two auxiliary points on the convex hull, each just on opposite sides of the wall, equal to the received signal strength of the interpolated coverage map at the intersection of wall and convex hull. For subclass (b), in one implementation, the RF coverage map generator may modify the perimeter of the interpolation region and use that as a new perimeter. In one implementation, the RF coverage map generator may then modify the convex hull to exclude all walls in subclass (b). In this way, walls without received signal strength points outside of them fall outside the convex hull, into the extrapolation region.

In one implementation, received signal strength averaging is most suitable for very close points. In one implementation, received signal strength interpolation may be suitable for close but somewhat more distant points. In one implementation, for distant points, received signal strength values may affect their immediate neighborhoods, with the effect of tapering away to the default pathloss model for the region between.

E. Example System Architecture for RF Coverage Map Generator

FIG. 6 illustrates an example hardware system 200, which may be used to implement an RF coverage map generator, which may be used to perform the interpolation and extrapolation processes described above. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one implementation, hardware system 200 may also include a keyboard and pointing device 222 and a display 224 coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the RF coverage map generator described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, and EEPROM. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic encoded in one or more storage media for execution and when executed operable to:
   receive coverage map data comprising a plurality of locations within a region, and an identification of a location in the plurality of locations corresponding to a radio transceiver, wherein the locations within the region are represented by at least corresponding x- and y-terms of a Cartesian coordinate system;
   receive calibration data comprising a plurality of observed signal strength values at corresponding ones of the plurality of locations;
   convert the x- and y-terms of the locations of the coverage map data to corresponding first and second warped coordinate terms of a warped coordinate system;
   compute, using linear interpolation and the first and second warped coordinate terms, predicted received signal strength values at one or more locations within a convex hull defined by the plurality of locations corresponding to the calibration data in the coverage map based on the calibration data; and
   extrapolate, for one or more locations of the coverage map outside of the convex hull, predicted received signal strength values based on a power path loss model and interpolated received signal strength values within the convex hull; wherein, to extrapolate predicted received signal strength values for locations outside the convex hull, the logic is further operable to:
      compute a first received signal strength value at a desired location based on a pathloss model;
      determine a convex hull intersection, wherein the convex hull is an area defined by three or more calibration points, wherein the convex hull intersection is the intersection of the convex hull and a line extending between a wireless access point and the desired location;
      compute a second received signal strength value at the convex hull intersection based on using the pathloss model;
      compute a third received signal strength value at the intersection using interpolation of calibration data; and
      compute a predicted received signal strength value based on the first, second, and third received signal strength values.

2. The logic of claim 1 wherein, in the warped coordinate system,
   an origin is the location in the region corresponding to the radio transceiver;
   D is the distance between the origin and a given location;
   θ is the angle from a fixed line passing through the origin and the given location relative to a reference line; and
   for each location in the region, the first warped coordinate term is (log 10 D)cos θ, and the second warped coordinate term is (log 10 D)sin θ.

3. The logic of claim 1 wherein a location of the wireless access point is at an origin of the warped coordinate system.

4. The logic of claim 1 wherein the logic is further operable to convert the predicted received signal strength values from a warped coordinate system data to the Cartesian coordinate system data.

5. The logic of claim 1 wherein the logic is further operable to account for walls inside the convex hull, walls partially inside and partially outside the convex hull, and walls outside the convex hull.

6. The logic of claim 1 wherein the warped coordinate system is based on a logarithmic function.

7. A method comprising:
   receiving coverage map data comprising a plurality of locations within a region, and an identification of a location in the plurality of locations corresponding to a radio transceiver, and wherein the locations within the region are represented by at least corresponding x- and y-terms of a Cartesian coordinate system;
   receiving calibration data comprising a plurality of observed signal strength values at corresponding ones of the plurality of locations;

converting the x- and y-terms of the locations of the coverage map data to corresponding first and second warped coordinate terms of a warped coordinate system; and computing, using linear interpolation and the first and second warped coordinate terms, predicted received signal strength values at one or more locations within a convex hull defined by the plurality of locations corresponding to the calibration data in the coverage map based on the calibration data; and extrapolating, for one or more locations of the coverage map outside of the convex hull, predicted received signal strength values based on a power path loss model and interpolated received signal strength values within the convex hull;

wherein extrapolating predicted received signal strength values for locations outside the convex hull comprises:

computing a first received signal strength value at a desired location based on a pathloss model;

determining a convex hull intersection, wherein the convex hull is an area defined by three or more calibration points, wherein the convex hull intersection is the intersection of the convex hull and a line extending between a wireless access point and the desired location;

computing a second received signal strength value at the convex hull intersection based on using the pathloss model;

computing a third received signal strength value at the intersection using interpolation of calibration data; and computing a predicted received signal strength value based on the first, second, and third received signal strength values.

8. The method of claim 7 wherein, in the warped coordinate system, an origin is the location in the region corresponding to the radio transceiver;

D is the distance between the origin and a given location;

$\theta$ is the angle from a fixed line passing through the origin and the given location relative to a reference line; and for each location in the region, the first warped coordinate term is $(\log 10\, D)\cos\theta$, and the second warped coordinate term is $(\log 10\, D)\sin\theta$.

9. The method of claim 7 wherein a location of the wireless access point is at an origin of the warped coordinate system.

10. The method of claim 7 further comprising converting the predicted received signal strength values from a warped coordinate system data to the Cartesian coordinate system data.

11. The method of claim 7 further comprising accounting for walls inside the convex hull, walls partially inside and partially outside the convex hull, and walls outside the convex hull.

12. The method of claim 7 wherein the warped coordinate system is based on a logarithmic function.

13. A system comprising:

a coverage map generator node operable to: receive coverage map data comprising a plurality of locations within a region, and an identification of a location in the plurality of locations corresponding to a radio transceiver, wherein the locations within the region are represented by at least corresponding x- and y-terms of a Cartesian coordinate system;

receive calibration data comprising a plurality of observed signal strength values at corresponding ones of the plurality of locations; convert the x- and y-terms of the locations of the coverage map data to corresponding first and second warped coordinate terms of a warped coordinate system; compute, using linear interpolation and the first and second warped coordinate terms, predicted received signal strength values at one or more locations within a convex hull defined by the plurality of locations corresponding to the calibration data in the coverage map based on the calibration data; and extrapolate, for one or more locations of the coverage map outside of the convex hull, predicted received signal strength values based on a power path loss model and interpolated received signal strength values within the convex hull; wherein the coverage map generator node, to extrapolate predicted received signal strength values for locations outside the convex hull, is further operable to:

compute a first received signal strength value at a desired location based on a pathloss model;

determine a convex hull intersection, wherein the convex hull is an area defined by three or more calibration points, wherein the convex hull intersection is the intersection of the convex hull and a line extending between a wireless access point and the desired location;

compute a second received signal strength value at the convex hull intersection based on using the pathloss model;

compute a third received signal strength value at the intersection using interpolation of calibration data; and compute a predicted received signal strength value based on the first, second, and third received signal strength values; and a wireless access point operable to facilitate collection of the calibration data.

14. The system of claim 13 wherein, in the warped coordinate system, an origin is the location in the region corresponding to the radio transceiver;

D is the distance between the origin and a given location;

$\theta$ is the angle from a fixed line passing through the origin and the given location relative to a reference line; and for each location in the region, the first warped coordinate term is $(\log 10\, D)\cos\theta$, and the second warped coordinate term is $(\log 10\, D)\sin\theta$.

15. The system of claim 13 wherein a location of the wireless access point is at an origin of the warped coordinate system.

16. The system of claim 13 wherein the coverage map generator node is further operable to convert the predicted received signal strength values from a warped coordinate system data to the Cartesian coordinate system data.

17. The system of claim 13 wherein the coverage map generator node is further operable to account for walls inside the convex hull, walls partially inside and partially outside the convex hull, and walls outside the convex hull.

* * * * *